Oct. 31, 1961 L. J. RENNENKAMPF 3,007,043

AUTOMATIC FREQUENCY CONTROL SYSTEM

Filed July 9, 1954 2 Sheets-Sheet 1

INVENTOR
LEONARD J. RENNENKAMPF

BY [signature]
ATTORNEY

Oct. 31, 1961 L. J. RENNENKAMPF 3,007,043

AUTOMATIC FREQUENCY CONTROL SYSTEM

Filed July 9, 1954 2 Sheets-Sheet 2

INVENTOR
LEONARD J. RENNENKAMPF
BY Ernest Fanwick
ATTORNEY 3,007,043

AUTOMATIC FREQUENCY CONTROL SYSTEM

Leonard J. Rennenkampf, Cedar Grove, N.J., assignor to International Telephone and Telegraph Corporation, Nutley, N.J., a corporation of Maryland Filed July 9, 1954, Ser. No. 442,254
13 Claims. (Cl. 250—20)

This invention relates to receiver circuitry and the like and more particularly to an improved automatic frequency control (AFC) system capable of locking the local oscillator frequency at a given value to provide the intermediate frequency (IF) of the receiver through a heterodyning action with received signal frequency regardless of whether the local oscillator frequency is lower or higher than the received signal frequency.

Where it is necessary to search in frequency for a transmitted signal from an object or a given location, it is necessary to provide a receiver which has a relatively broadband frequency response and means therein to sweep the local oscillator frequency over this broadband of frequencies. As soon as the difference between the local oscillator frequency and the received frequency signal equals the frequency of the intermediate amplifier of the receiver, the sweeping of the local oscillator should be stopped and means should be provided, usually by an AFC circuit, to maintain the local oscillator signal at such a value that the incoming signal will be centered in the bandwidth of the IF amplifier.

Since in receivers of this type, the bandwidth of the RF portion and the frequency range through which the local oscillator frequency is swept is so large relative to the center frequency and bandwidth of the intermediate amplifier, it is possible to have two received images of the transmitted signal, one image when the local oscillator signal is below the signal frequency and the other image when the local oscillator is above the signal frequency. Since the local oscillator is usually mechanically tuned from its lowest to its highest frequency, the lower image is encountered first. In this situation, the frequency passing through the IF amplifier is initially greater than the center frequency of the IF amplifier and then less than the center frequency of the IF amplifier. If the local oscillator is tuned through the second image, the reverse is true. Due to this reversal of intermediate frequencies as the oscillator is tuned through both images, it is obvious that the discriminator of the usual AFC circuit will not function properly to control the local oscillator frequencies on both images. This shortcoming of the discriminator in the usual AFC circuit which locks on only one of the two possible signal images rather than on either one of the image signals increases the amount of time required to tune the receiver to the signal frequency being received thereby. Furthermore, if the usual AFC circuit should attempt to control the local oscillator on the wrong image, the acquisition of the transmitted signal by the receiver will be further increased in time due to the control signal of wrong polarity being applied to the local oscillator which will shift its frequency in the opposite direction from that desired to obtain stable equilibrium at the desired frequency.

Heretofore, it has been necessary to incorporate in receiver circuitry of this type a means to discriminate between the two resulting images, or a means to determine which image the receiver is tuned to and polarize the AFC loop accordingly. The latter scheme is necessarily complex and has poor prognosis of reliability, especially at low signal-to-noise levels. The former scheme, while it produced desired receiver tuning or locking at the transmitted beacon signal, there was required in addition to the AFC circuit a means to reject the undesired image. To achieve the image rejection, it was necessary to provide a proper control on the means used to sweep the local oscillator through the RF bandwidth, or provide a relatively complex dual output discriminator, subtracting means for the outputs thereof, and circuitry for recognizing from output of the subtracting means whether the receiver is tuned to the desired or undesired image.

It is an object of this invention to provide an AFC circuit enabling a rapid tuning of a broadband receiver for reception of a signal transmitted in the bandwidth of the receiver.

Another object of this invention is to provide an ambistable AFC circuit operable upon either image of a signal disposed within the bandwidth of a broadband heterodyne type receiver.

Still another object of this invention is to provide a pulse type broadband heterodyne receiver having an ambistable AFC circuit to produce stable equilibrium at a desired frequency regardless of whether the local oscillator frequency is above or below the received signal.

A feature of this invention is the provision of an ambistable AFC circuit in a double pulse type communication system wherein the relative amplitudes of the two pulses control the frequency of the local oscillator and the relative amplitude relationship is consistent for each of the images of the received signal enabling the locking of the receiver on either image thereof with the same AFC loop.

Another feature of this invention is the provision of an AFC circuit comprising a sharply tuned circuit tuned to the center frequency of the IF amplifier bandwith, an amplitude detector to detect the amplitude of each pulse of a pulse pair passed through said tuned stage and a pulse comparator for comparing the relative amplitudes of each pulse of a pulse pair to provide an output signal for controlling the frequency of the local oscillator to provide stable equilibrium at the desired frequency regardless of whether the local oscillator frequency is above or below the signal frequency.

Still another feature of this invention is the provision of a pulse comparator comprising coincident gating arrangements including a pair of normally non-conductive electron discharge devices and associated delay networks such that one of said devices is keyed into conduction by a delayed keying signal derived from the detected pulses to provide an output proportional to the amplitude of the first pulse of the pulse pair and the other of said devices is keyed into conduction by an undelayed keying signal derived from the detected pulses to provide an output proportional to the amplitude of the second pulse of the pulse pair and a subtraction circuit coupled to the output of each of said devices to produce an output voltage varying in accordance with the relative amplitudes of the first and second pulses of the pulse pair, the resulting voltage being employed to control the frequency of the local oscillator for stable equilibrium at the desired frequency on either image of the received signal.

The above-mentioned and other features and objects of this invention will become more apparent by reference to the following description taken in conjunction with the accompanying drawings, in which.

The improved AFC system of this invention will be herein described with reference to a specific type of pulse communication signal. However, it is to be understood that the circuit of this invention is not necessarily limited to this specific type of pulse signal, since other pulse signals may be modified by employing well-known techniques to provide a desired pulse pair for application to the AFC circuit for amplitude comparison of the two pulses of the pulse pair whereby the relative amplitudes thereof provide a control signal for adjusting the frequency of the local oscillator in a manner to provide stable equilibrium of the receiver at the desired frequency regardless of the image to which the receiver is tuned. Furthermore, it is to be understood that while stable equilibrium at a desired frequency may be accomplished whether the local oscillator frequency is above or below the signal frequency without need to provide means to recognize which image passes through the IF amplifier, it is obvious that the AFC system will operate as described herein in a narrow band receiver where only one of the two possible images are capable of being present in the receiver.

Figure 1:
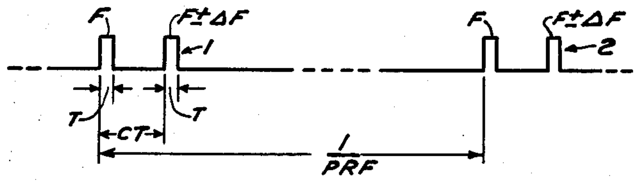
FIG. 1 is an illustrative example of the double pulse type signal upon which the AFC circuit of this invention is operable.

The specific type of pulse signal utilized herein for purposes of description is the double pulse type of pulse modulation substantially as illustrated in FIG. 1. Thus, a transmitter, such as a beacon transmitter, will transmit a double pulse type of modulation signal with one pulse at a carrier frequency F and the other pulse of the pair at a slightly displaced carrier frequency F plus or minus a desired carrier frequency shift $\Delta F$. The double pulses of the transmission spectrum, as indicated at 1 and 2, are separated by a suitable time interval. This time interval will, of course, be related to the pulse repetition frequency (PRF). Intelligence is conveyed by this type of pulse signal by a variation of the frequency shift $\Delta F$ of one pulse with the respect to the other. In other words, the time spacing CT between the first and second pulse of the pulse pair is varied in accordance with the intelligence being transmitted where T is related to the width of the individual pulses and C is a constant to establish a given relationship between the width of the individual pulses and the spacing between the pulses of the pulse pair. This spacing and the width of the individual pulses as well as the PRF and $\Delta F$ of a double pulse signal are non-critical to the operation of the AFC system of this invention and may have given values appropriate to the over-all communication system consistent with a given application of this system. Such a double pulse signal may be generated in a magnetron by taking advantage of the frequency pushing concomitant to the variation in pulse current which may be considered a natural by-product of double pulse operation.

Figure 2:
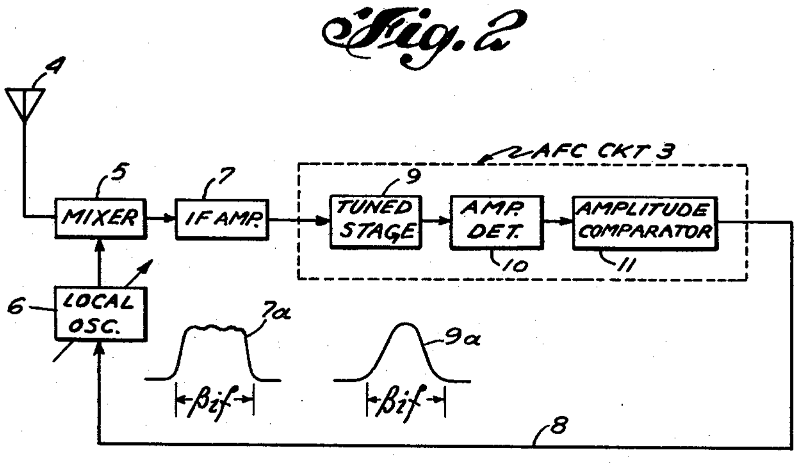
FIG. 2 is a block diagram of a broadband receiver incorporating the AFC circuit of this invention.

Referring to FIG. 2, there is illustrated a block diagram of a broadband radio frequency superheterodyne receiver incorporating the AFC circuit 3 of this invention. The function of circuit 3 is to enable stable equilibrium of the receiver when it is tuned to a transmitted frequency signal located in the bandwidth of the receiver regardless of whether the local oscillator frequency is above or below the frequency of the transmitted signal.

The receiver comprises a broadband antenna 4 capable of receiving a signal so disposed to be present in the bandwidth thereof, the bandwith being in the order of several hundred megacycles. For example, the receiver may have a bandwidth of 500 megacycles with the antenna capable of receiving signals lying between 34,650 megacycles of 35,150 megacycles. The received signal on antenna 4 is coupled to a mixer 5 wherein the received signal is mixed with the signal of the tunable local oscillator 6 which has its frequency tuned or swept through the 500 megacycles between the frequency limits of 34,590 megacycles to 35,090 megacycles by a manual or a mechanical device. Comparing the frequency range of the antenna and the frequency range of the local oscillator, in the example herein presented, it is obvious that the local oscillator frequency range is displaced relative to the frequency range of the antenna by a frequency of 60 megacycles which corresponds to the IF frequency. The resulting output of mixer 5 is coupled to the IF amplifier 7 which passes the received signal therethrough when the frequency of the received signal and the frequency of the local oscillator produces a difference corresponding to the IF frequency. The bandwidth of the IF amplifier for the example herein presented was in the order of 10 megacycles, as represented by curve **7*a*. This difference frequency or IF frequency of 60 megacycles will occur at two points in the bandwidth scanned by the local oscillator, once when the local oscillator frequency is below the signal frequency which represents the lower signal image, and again when the local oscillator frequency is above the signal frequency which constitutes the upper signal image. The output of amplifier 7, either the upper or lower image, is coupled to circuit 3 which has an operating characteristic capable of operating on either one of the images to provide a control signal for adjusting the frequency of the local oscillator such that when the transmitted signal is received and the frequency sweeping of the local oscillator is stopped, stable equilibrium will be maintained regardless of the image passing through amplifier 7**.

The output of amplifier 7 is coupled to circuit 3 which develops a control voltage for conduction along lead 8 to maintain oscillator 6 at a frequency such as to maintain a difference frequency corresponding to the center frequency of amplifier 7. Circuit 3 comprises a sharply tuned stage 9 having a selectivity characteristic centered in the bandwidth of amplifier 7, as indicated in curve **9*a*. This tuned stage replaces the usual frequency discriminator incorporated in heretofore employed AFC circuits which are usually capable of operating only on one given signal image. The resultant output of stage 9 is coupled to an amplitude detector 10 and hence to an amplitude comparator 11 which produces the control voltage of proper magnitude and polarity depending upon the amplitude relationship existing between the individual pulses of the double pulse signal. Detector 10, in certain applications where the characteristics of amplifier 7 and stage 9** are such as to distort the received signal, may be replaced by a Ferris discriminator to shape the selectivity of the receiver, but in most instances the selectivity of the receiver will be sufficient to enable the employment of a simple amplitude detector.

Figure 3:
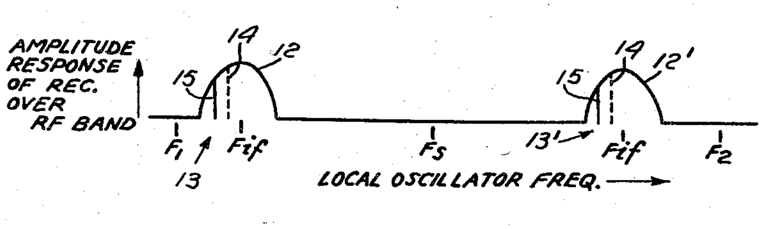
FIG. 3 is a graphical representation of the receiver response over the entire radio frequency bandwidth useful in explaining the operations of the AFC circuitry of this invention.

With reference to FIG. 3, the control relationship of this improved AFC circuit may be more clearly understood and will illustrate that the control relationship is consistent for both possible signal images which is not the case with the usual frequency discriminator type AFC circuit. FIG. 3 graphically illustrates the receiver response over the entire radio frequency bandwidth. As oscillator 6 is swept in frequency from $F_1$ to $F_2$ with the transmitted frequency located at $F_s$, the lower image is encountered and the local oscillator frequency will sweep through the selectivity curve of tuned stage 9, as indicated at 12. Continuing the frequency sweep of the local oscillator, its frequency continues towards $F_2$ until such time as the second image is encountered. The selectivity curve of the tuned stage 9 for the upper image is indicated at 12' to be identical to the selectivity curve 12 at the first image frequency. If the difference between the signal frequency and the local oscillator frequency is not exactly the center frequency of the amplifier 7, but within the bandwidth thereof, the pulses of the double pulse transmission will not have the same amplitude due to the action of the selectivity of tuned stage 9. One of the three possible amplitude relationships of the two pulses is illustrated in FIG. 3 by the pulse pairs 13 and 13', respectively, disposed under the selectivity curve 12 and 12'. Since the double pulses will occupy the same relative position under both selectivity curves, a general rule of operation may be deduced. When the second pulse 14 of the pulse pair is greater in amplitude than the first pulse 15, the local oscillator frequency should be lowered by the action of the control voltage developed in comparator circuit 11. If the converse condition of the pulses of the pulse pair is true; that is, when the first pulse 15 is greater in amplitude than the second pulse 14, the local oscillator frequency should be increased. This relative amplitude relationship between the pulses of the pulse pair is consistent for either image as is obvious from the illustrations of FIG. 3 and, therefore, enables the operation of the AFC circuit on either image with the same AFC loop, thereby eliminating the necessity of providing means to recognize the image received and polarizing the AFC loop accordingly.

Figure 4:
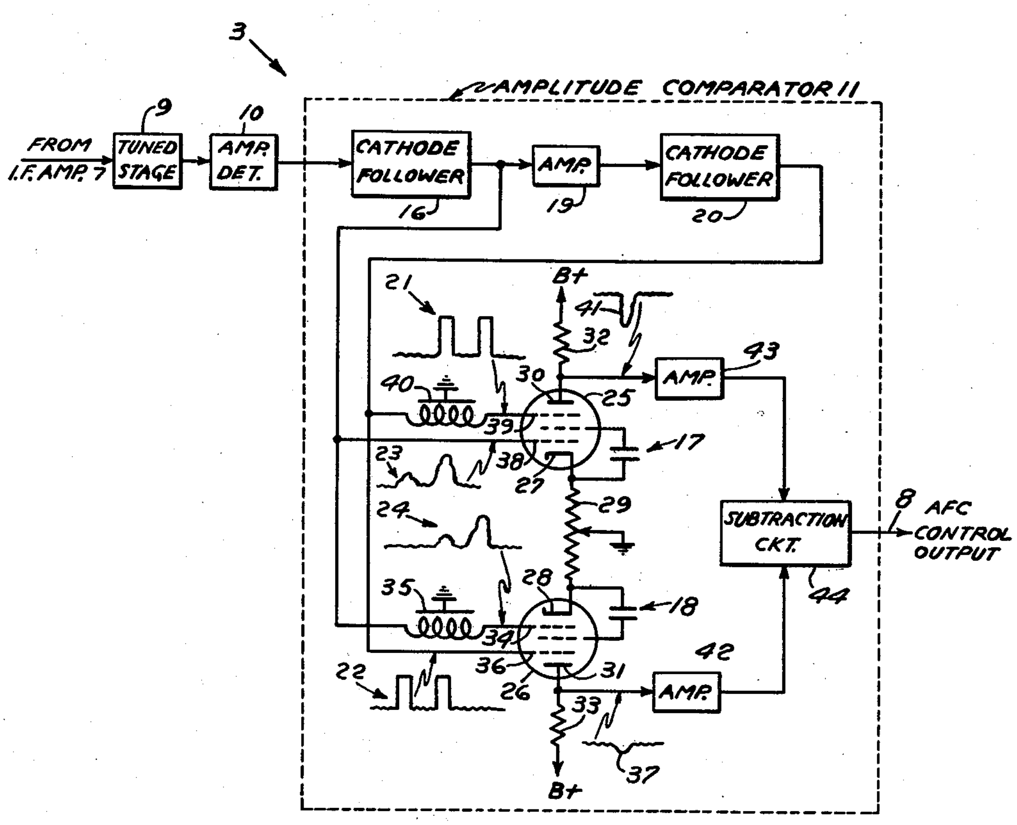
FIG. 4 is a partial schematic diagram of the ambistable AFC circuit in accordance with the principles of this invention.

Referring to FIG. 4, a partial schematic diagram of AFC circuit 3 is shown, the structure of which enables the comparison of the relative amplitudes of the pulses of the pulse pair conducted thereto from IF amplifier 7 for developing a control voltage of sufficient magnitude and polarity for conduction along line 8 to control the frequency of the local oscillator 6 in accordance with the general rule hereinabove set forth. The AFC circuit of this invention comes into action once the IF amplifier 7 has accepted the received signal present in its bandwidth and the sweeping of the oscillator 6 has halted. In a motor controlled sweeping arrangement of oscillator 6 the presence of a signal output of the amplifier 7 would de-energize the driving motor associated with oscillator 6 to discontinue the sweeping action of oscillator 6. This control arrangement for the sweeping of oscillator 6 is not illustrated since its incorporation in the disclosed circuitry would tend to confuse and distract from the novel AFC circuit of this invention. It is to be understood, however, that such a motor sweeping device and control therefor may be incorporated in the receiver of this disclosure or that a manual sweeping of the oscillator 6 may be accomplished wherein a visual indication, such as made possible by an oscillocope, would tell the operator when to stop the sweeping of the local oscillator frequency.

The double pulse output of amplifier 7 is coupled to tuned stage 9 having a very sharp selectivity characteristic and enables the development of a pronounced amplitude difference between the pulses of the pulse pair when the received signal is not centered in the IF bandwidth. The amplitude pulse output is coupled to detector 10 for production of a pulse output representative of the amplitude of the individual pulses of the pair. This detected output is coupled to the amplitude comparator 11 which develops the AFC control voltage. The organization and operation of comparator 11 is considered rather unique and the functioning thereof in conjunction with FIG. 4 is described hereinbelow. The detected output of detector 10 is coupled to cathode follower 16 and hence to a pair of normally non-conducting coincidence gating devices 17 and 18. The output of cathode follower 16 is also coupled to an amplifier 19 whose output is coupled via cathode follower 20 to devices 17 and 18. As is the common practice cathode followers 16 and 20 are utilized as impedance matching devices between the gating devices 17 and 18 and detector 10 and amplifier 19, respectively. Amplifier 19 is employed herein to provide sufficient amplitude for the pulses of the pulse pair to enable the utilization thereof as the keying signal for devices 17 and 18. The characteristic of amplifier 19 is such that the amplified pulse pair output consists of equal amplitude pulses as indicated at 21 and 22. The output of cathode follower 16 coupled to devices 17 and 18 is representative of the relative amplitude of the pulses of the pulse pair passing through tuned stage 9, as illustrated at 23 and 24.

The gating devices 17 and 18 include electron discharge devices 25 and 26, respectively, illustrated to be a pentode type device, but may conceivably be of the tetrode type. The cathodes 27 and 28 of the discharge devices have a common resistor 29 coupled thereto with a movable tap thereon coupled to ground which provides a means to balance the bias on devices 25 and 26 and thus establish the cut-off point for the electron discharge devices and likewise controls the conduction therethrough when keyed into conduction such that the characteristics of the discharge devices do not effect the gating of the devices 25 and 26 into conduction and the relative amplitudes of the pulses of the pulse pair passed therethrough. The anodes 30 and 31 of the discharge devices each are connected to an appropriate anode power supply through individual load resistors 32 and 33 with the respective outputs of the discharge devices being removed from the junction between the anodes and the load resistors.

Let us consider the action of the gating devices including the normally non-conductive discharge devices 25 and 26. Consider first device 26. The pulse pair from cathode follower 16 is conducted to the control grid 34 of device 26 through a delay line 35. The amplified output of cathode follower 20 is conducted to the suppressor grid 36 of device 26 without encountering any delay. Thus, the delay line 35 delays pulse pair 24 an amount constant with the transmitted signal to cause coincidence between the first pulse of pulse pair 24 and the second pulse of the amplified pulse pair 22. This coincidence keys device 26 into conduction and results in an output at anode 31 proportional to the amplitude of the first pulse of the pulse pair, as indicated at 37. Consider now device 25. The output of cathode follower 16 is coupled to control grid 38 of device 25 while the amplified output of cathode follower 20 is coupled to the suppressor grid 39 of device 25 via delay line 40. Delay line 40 produces a given delay in the amplified pulse pair 21 of sufficient amount to cause coincidence between the second pulse of pulse pair 23 and the first pulse of the amplified pulse pair 21. This coincidence keys device 25 into conduction and produces an output at anode 30 proportional to the amplitude of the second pulse of the pulse pair, as indicated at 41.

The gating or keying action of devices 25 and 26 will occur substantially simultaneously but only when the appropriate coincidence between the pulses of the delayed and undelayed pulse pairs, as derived from the same input signal to the AFC circuit 3, is present. The resultant pulses 37 and 41 are amplified, respectively, by amplifiers 42 and 43 for presentation to subtracting circuit 44. The action of circuit 44 is to subtract the amplified outputs of devices 25 and 26 such that the output voltage therefrom varies in accordance with the relative amplitudes of the first and second pulses in the pulse pair. This resultant output constitutes the control voltage for conduction along lead 8 which is applied to local oscillator 6 to control its frequency. If the local oscillator is of the klystron type, as is the usual practice in receivers operating in the frequency range illustrated, the control voltage from circuit 44 would be applied to the repeller electrode of the klystron to control its frequency in a manner well-known to those skilled in the art.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a heterodyne receiver having a local oscillator and a mixer circuit; an automatic frequency control circuit to control the heterodyning of the frequencies of a received signal which signal includes repetitive pairs of spaced pulses, the first pulse of said pairs of pulses being at a first carrier frequency and the second pulse of said pairs of pulses being at a second carrier frequency spaced a small increment from said first carrier frequency comprising means to receive said pairs of spaced pulses coupled to said mixer circuit, a tuned circuit coupled to receive the output of said mixer circuit, detection means responsive to the output of said tuned circuit to detect the amplitude of each of the pulses of said pairs of spaced pulses, comparison means responsive to the relative amplitudes of the pulses of each of said pairs of spaced pulses to produce a control voltage, means coupled to said detection means for simultaneously applying the detected amplitudes of each of the pulses of each of said pairs of spaced pulses to said comparison means, and means coupling said control voltage to said local oscillator to maintain the output frequency of said mixer circuit centered in the bandwidth of said tuned circuit.

2. The apparatus according to claim 1, wherein said tuned circuit has a relatively sharp selectivity characteristic and the off-center positioning of each of said pulse pair in the bandwidth of said tuned circuit causes a relative amplitude difference between the pulses of each of said pulse pair due to said selectivity characteristic.

3. The apparatus according to claim 1, wherein said comparison means includes a first gating means, a second gating means, a first conductive path to couple the output from said detection means to each of said gating means, a second conductive path including means therein to amplify said detected pulse amplitudes and means to couple said amplified pulses to each of said gating means, said first conductive path including a first delay device coupled to said first gating means to delay the output of said detection means with respect to its associated one of said amplified pulse pair for coincidence between the first pulse of said detection means output and the second pulse of said associated one of said amplified pulse pair to produce an output from said first gating means proportional to the amplitude of said first pulse, said second conductive path including a second delay device coupled to said second gating means to delay said associated one of said amplified pulse pair with respect to said detection means output for coincidence between the first pulse of said associated one of said amplified pulse pair and the second pulse of said detection means output to produce an output from said second gating means proportional to the amplitude of said second pulse, and a subtraction circuit common to the outputs of said gating means to produce said control voltage.

4. The apparatus according to claim 3, wherein each of said gating means include a normally non-conductive electron discharge device having at least a cathode, an anode, a control grid and a screen grid, each of said screen grids being coupled to said second conductive path for appropriately keying said discharge devices into conduction.

5. The apparatus according to claim 4, wherein the cathodes of each of said electron discharge devices have a resistor coupled therebetween with a movable center tap disposed thereon coupled to ground for balancing the characteristics of said electron discharge devices.

6. The apparatus according to claim 4, wherein the output of said detection means is coupled via said first conduction path to the control grids of said electron discharge devices and the outputs of said gating means are removed from the anodes of said devices upon coincidence of the appropriate pulses of the pulse pairs conducted, respectively, on said first and said second conductive paths.

7. A broadband heterodyne receiver responsive to a received signal which signal includes repetitive pairs of spaced pulses, the first pulse of said pairs of pulses being at a first carrier frequency and the second pulse of said pairs of pulses being at a second carrier frequency spaced a small increment from said first carrier frequency comprising a broadband frequency antenna for receiving said pairs of pulses, a local oscillator, mixing means coupled to said antenna and said oscillator to produce from the frequencies of said first and second pulses and the frequency of said local oscillator a difference frequency range, amplifier means coupled to said mixing means for passing only a given difference frequency range corresponding to the intermediate frequency range of said receiver, means to tune the frequency of said oscillator through the frequency range of said antenna until said given difference frequency range is produced and an automatic frequency control circuit coupled between said amplifier means and said oscillator including means responsive to each of said pairs of pulses to separate the pulses of each of said pairs of pulses from each other, to place said separated pulses in time coincidence and to simultaneously operate on said separated pulses to produce a control signal proportionally to the difference in amplitude of said separated pulses to maintain said given difference frequency range independent of the relative relation of the local oscillator frequency with respect to the frequencies of the received pairs of pulses.

8. A receiver according to claim 7, wherein the means of said automatic frequency control circuit includes a tuned circuit coupled to the output of said amplifier means, detection means responsive to the output of said tuned circuit to detect the amplitude of each of the pulses of each of said pairs of pulses, comparison means responsive to the relative amplitudes of the pulses of each of said pairs of pulses to produce a control voltage, means coupled to said detection means for simultaneously applying the detected amplitude of each of the pulses of each of said pairs of pulses to said comparison means, and means coupling said control voltage to said local oscillator to maintain the output frequency of said mixing means centered in the bandwidth of said amplifier means.

9. A receiver according to claim 8, wherein said tuned circuit has a relatively sharp selectivity characteristic and the off-center position of each of said pairs of pulses in the bandwidth of said tuned circuit causes a relative amplitude difference between the pulses of each of said pairs of pulses due to said selectivity characteristic.

10. A receiver according to claim 8, wherein said simultaneously applying means and said comparison means includes a means to derive from the output of said detection means a triggering pulse pair, a first normally non-conductive gating means, a second normally non-conductive gating means, means to couple the output of said detection means to each of said gating means, means coupling said triggering pulse pair to said gating means, delay means associated with each one of said gating means to delay the respective signals applied thereto with respect to each other in a manner whereby said first gating means upon coincident gating thereof produces an output proportional to the first pulse of each of said pairs of pulses and said second gating means upon coincident gating thereof produces an output proportional to the amplitude of the second pulse of each of said pairs of pulses, each of said delay means being arranged so that each of said gating means are simultaneously gated and subtraction means common to the outputs of said gating means to produce from the amplitude difference existing therebetween said control voltage.

11. A receiver according to claim 10, wherein each of said gating means include a normally non-conductive electron discharge device having at least a cathode, an anode, a control grid and a screen grid, each of said screen grids being coupled to said second conductive path for gating said discharge device into conduction.

12. In an automatic frequency control circuit an amplitude comparator for developing a control voltage in response to the relative amplitude of the first and second pulses of repetitive pairs of spaced pulses, the first pulse of said pairs of pulses being at a first frequency and a second pulse of said pairs of pulses being at a second frequency spaced a small increment from said first frequency comprising an input for said pairs of spaced pulses, a first normally non-conductive gating means to produce an output therefrom proportional to the amplitude of said first pulse of each of said pairs of spaced pulses, a second normally non-conductive gating means to produce an output therefrom proportional to the amplitude of said second pulse of each of said pairs of spaced pulses, a first conductive path from said input to each of said gating means, a second conductive path from said input to each of said gating means including means to produce amplified pairs of spaced pulses, said first gating means including a first delay line to delay each of said pairs of spaced pulses with respect to associated one of said amplified pairs of spaced pulses to enable the second pulse of said associated one of said amplified pairs of spaced pulses to key said first gating means into conduction upon coincidence with the first pulse of each of said pairs of spaced pulses, said second gating means including a second delay line to delay said associated one of said amplified pairs of spaced pulses to enable the first pulse thereof to key said second gating means into conduction upon coincidence with the second pulse of each of said pairs of spaced pulses, said first and second delay lines being arranged so that each of said gating means are simultaneously gated, and a subtraction circuit common to the outputs of said gating means producing a control voltage with respect to the variation of relative amplitude differences between said first and second pulses of each of said pairs of spaced pulses suitable to control the frequency of an oscillator circuit.

13. The apparatus according to claim 12, wherein each of said gating means include a normally non-conductive electron discharge device having at least a cathode, an anode, a control grid and a screen grid, the control grid of said first gating means being coupled to said first delay device and the screen grid of said second gating means being coupled to said second delay device.

References Cited in the file of this patent

UNITED STATES PATENTS

| | | |
|---|---|---|
| 2,118,917 | Finch | May 31, 1938 |
| 2,339,851 | Hansell | Jan. 25, 1944 |
| 2,393,921 | Mason | Jan. 29, 1946 |
| 2,482,782 | Lenny | Sept. 27, 1949 |
| 2,510,139 | Purington | June 6, 1950 |
| 2,647,994 | Weiss | Aug. 4, 1953 |
| 2,725,555 | Hopper | Nov. 29, 1955 |

FOREIGN PATENTS

| | | |
|---|---|---|
| 975,945 | France | Oct. 17, 1950 |